United States Patent Office 3,082,09
Patented Mar. 19, 196

3,082,099
INORGANIC FIBERS AND METHOD OF
PREPARATION
Robert M. Beasley and Herbert L. Johns, Cleveland, Ohio,
assignors to Horizons Incorporated, Cleveland, Ohio,
a corporation of New Jersey
No Drawing. Filed Feb. 26, 1960, Ser. No. 11,121
9 Claims. (Cl. 106—39)

This invention relates to novel inorganic fibrous compositions, to methods for preparing same and to the formulations from which they are prepared. More particularly, it relates to the preparation of novel inorganic fibers possessing outstanding structural and mechanical properties, to the fibers themselves and to their utility as insulation against heat or sound.

In an earlier filed United States patent application, Serial No. 777,193, filed December 1, 1958, we have disclosed a procedure for forming inorganic fibers by removing the liquid phase from thin films of suitable composition disposed on surfaces to which the composition does not adhere. The application also discloses that the dimensions and properties of the fibers so produced may be controlled by varying the manner in which the process is carried out. Improvements of the process described in the aforesaid application are described in a related United States patent application, Serial No. 829,220, filed July 24, 1959.

In the aforementioned applications, the fiber-forming process is described in terms of various fiber yielding compositions which include the following: sols comprising either dispersions of inorganic oxides in water solutions; or solutions of organic salts, particularly the metal salts of organic acids exhibiting dissociation constants of at least $1.5 \times 10^{-5}$ dissolved either in aqueous or non-aqueous solvents, either alone or in admixture with one another.

It has now been found that by employing as the film-forming composition a composition consisting of the following essential components in suitable relative proportions (1) a water soluble metal salt of an organic acid, (2) a salt of a metal and a strong inorganic acid, and (3) a properly constituted silica sol, several important advantages accrue over the procedures and products defined in the aforementioned earlier filed applications.

In general terms, these advantages may be stated as follows: compositions having a much higher concentration of dissolved oxide (actually present as salts) may be used with greatly increased speed of production of fibers, but without hindering the effectiveness of the fiber production. Further by the use of these compositions in a specific pH range, not only is this greatly increased speed of production obtained but the fibers are generally smaller in cross section and of greater length than those obtained with the procedures disclosed in the earlier referred to applications. In addition, the fibers obtained from such relatively higher speed production are superior in many mechanical respects such as strength, flexibility before and after firing, restriction on crystal growth, and general utility.

Novel fibers produced in accordance with the present invention are in the form of ribbons of rectangular cross section in lengths ranging from less than 1″ up to 8″ and having widths in the range of about 2 microns to 20 microns and thicknesses from about 0.1 to about 1 micron and consist of two classes of chemical compos tions, one being a modification of the other: the fi class consists of between about 5% and 15% by weig of silicon dioxide and between about 95% and 85% of metal oxide; the second class consists of ratios of silic dioxide and metal oxide identical with the descripti in the preceding phrases, but complexed further wi chemical combinations of water of hydration and residu carboxylic acid. The second class is produced at lc temperatures of heat treatment and the first class is o tained as the result of heating these low temperatu produced materials to temperatures sufficient to cau sintering.

The elements which may be used for the major porti of these novel fibers may be selected from the group co sisting of aluminum, the rare earths, zirconium, hafniu chromium, thorium, iron, cobalt, manganese, nickel a vanadium. These are supplied to the fiber-forming co position in the form of organic salts or as salts of stro inorganic acids or both.

The organic salts of these metals are those wherein t acid is an acyclic carboxylic acid whose dissociation co stant is at least $1.5 \times 10^{-5}$. Among the acids whose me salts may be used are the following: formic, acetic, oxal maleic, adipic, itaconic, citric, tartaric, lactic and th halogen derivatives, e.g. chloroacetic acid, and the lil Of these we prefer the acetates because of their rea commercial availability and their low cost when co pared with the salts of the other acids stated above.

The inorganic acids whose metal salts have been fou particularly suitable are HCl and $HNO_3$. As in the ca of the organic salts, the salts are preferably supplied the fiber-forming composition in the form of a conce trated water solution. Depending on the salt, such co centrations may vary from a minimum of 10% oxi content to as high as 35% oxide content dissolved the solution.

The fiber-forming composition may be formed of m tures of more than two salts. The composition compris a major proportion of a water soluble organic salt a a minor proportion of a water soluble inorganic sa together with a small amount of a properly constitut silica sol.

The addition of suitable amounts of silica sol to m tures of organic and inorganic salts described above, celerates the fiber-forming process and in addition it h been found that by control of the amount of silica the final product a fiber is produced which has grea strength, flexibility and mechanical integrity than produced in its absence.

The silica sol is preferably supplied to the compositi in concentrated form, for instance as concentrations from 30% to 50% of silica dispersed in water. The p portion of silica sol in the fiber-forming composition such as will provide a total content of silica in the fi fiber varying between a lower limit of 5% and an up limit of 15% by weight.

Two distinct kinds of fibers are obtained as a res of processing of these compositions depending on the h treatment. In the first, involving removal of fibers fr the smooth surface at temperatures not exceeding abc 200° C., the compositions are made available in t form of ribbon-like filaments, and this structure is ma fined throughout subsequent heat treatment. In this first low temperature phase the oxides and the mixtures thereof comprising the chemical makeup of the fiber still contain significant amounts of combined water, generally in the form of hydroxyl groups, and residues of carboxylic acid substituents. The mineral acid portions are pretty thoroughly dissipated. In this form they are still chemically reactive towards strong acid reagents but are insoluble in water. In addition, they are porous, adsorptive, and in all probability contain submicroscopic capillaries. When such fibers are fired to a sintering temperature, shrinkage of about 30 to 35% takes place in the various dimensions, the porosity is eliminated so as to yield a dense translucent to transparent structure, and the solubility in chemical reagents is minimized or eliminated.

The amount of organic hydrated material which still remains is a function not only of the metal oxide used, but also of the organic acid. For example, in the case of the zirconia fibers complexed with silica, the loss in weight between fibers as formed directly on the smooth surface and fibers after having been subjected to sintering temperature is approximately 33 to 35%. Chemically it has been determined that the zirconia compound present in the fiber after low temperature formation in the case where the acetate is used is in accordance with the empirical formula:

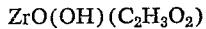
$$ZrO(OH)(C_2H_3O_2)$$

this being an empirical formula approximately equivalent to about 67% zirconium oxide by weight. In the case of the alumina acetate compound, for example, the loss in weight between the 200° C. fiber and the fiber after sintering empirically appears to be equivalent to the equation:

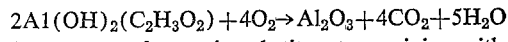
$$2Al(OH)_2(C_2H_3O_2) + 4O_2 \rightarrow Al_2O_3 + 4CO_2 + 5H_2O$$

The amount of organic substituent remaining with the fiber at a temperature not exceeding 200° C. is, to a certain extent, a function of the boiling point or sublimation point of the acid involved. Some decompose to form mixed carbonates and hydrates. For example, oxalic acid produces compositions comparable to those obtained from the acetates in view of the fact that it sublimes at 150° C., whereas the citric acid derivatives produce dark-colored caramel type derivatives, but still in fibrous forms.

The low temperature fiber may be utilized in this form for complexing purposes when it is desired to make interleavings of fiber of one composition with another in order to achieve directional properties as a function of chemical composition. Such complexing is more advantageously accomplished at this stage rather than at a later stage.

It has been further found that the fibering process proceeds most rapidly at highly acid pH's below 2 and preferably within the range of 1 to 2. This pH may be obtained by the addition of a concentrated strong acid such as HCl or HNO₃. It has, however, been found advantageous to reach the desired pH by addition of a metal salt of a strong mineral acid such as HCl or HNO₃ to accomplish both the acidification and the further increase in concentration of the composition with respect to the metal oxide.

It should be noted that to broaden the range of compositions in the final product, mixtures and particularly mixtures of the metal salts of organic acids are found to be quite useful.

The fibering process comprises the following sequence of operations:

(1) Preparation of a suitable composition.
(2) Coating a clean glass substrate with a layer of the composition of the proper thickness, between 10 and 50 microns being generally suitable.
(3) Removal of the liquid present by rapid heating to temperature of about 100° C. to 150° C. for a very short time.
(4) Removal of the resulting fibers from the supporting surface.
(5) Prefiring the fibers to remove all organic materials and substituents, 500° C. to 600° C. in a sagger being typical temperatures, and
(6) Final firing at about 1200° C. (900° C.–1500° C. depending on the material processed and properties desired) for about one hour.

Once a solution is available for the production of fibers, a preferred fiber-forming procedure comprises pouring the solution onto a glass surface in layer thicknesses of the order of 10 to 50 microns and then placing the same in the path of radiation of an infrared lamp. The fiber dimensions are determined in part by the thickness of the layer. If, as is preferred, the glass substrate is an absorber of infrared radiation, its temperature is raised almost immediately to a level of 100 to 150° C. with the end result that the elimination of moisture and the fiber-forming reaction itself are completed within a matter of one to five minutes. The fibers thus obtained are loose since they break away from the surface and produce a multiplicity of fibers ranging in length from 1 to 2 inches up to, in some cases, as long as 8 inches. The fibers are then placed in a sagger and given a prefire at temperatures between 500 and 600° C. to remove all organic material and substituents, and are then finally fired for periods of about one hour at temperatures of the order of 1200° C.

The following specific examples will further illustrate the invention and are to be regarded as illustrative of but a few of the many possible variations in materials, concentrations and procedures intended to be construed within the scope of the invention.

*Example 1*

The stock solutions from which the fibering matrix was made were based on a zirconium acetate solution containing 15% zirconium oxide by weight, concentrated hydrochloric acid containing 36% HCl by weight, a silica sol containing 35% silica by weight, and a trace of wetting agent comprised of a 50% solution of sodium lauryl sulfonate. The reagents were placed in a beaker in the order hereinafter described, stirred, and immediately deposited on a clean glass surface.

Nine hundred and five cc. of the zirconium acetate solution were first placed in a glass beaker, followed by the addition of 44 cc. of hydrochloric acid. Ten drops of the sodium lauryl sulfonate were then added, followed by 51 cc. of the 35% silica sol. As indicated, the reagents were added to the beaker in the order given and the batch vigorously stirred before the next reagent was added. Once the mixture was available in fully stirred and fully mixed condition, it was then poured on infrared absorbing glass plates in thicknesses of between 10 and 50 microns as established by doctor blading. The coated plates were immediately placed under a bank of infrared lamps having a total power input of 1500 watts which was focused on the glass plate supporting the fibering solution at a distance of 15 inches. Evaporation of solvent commenced substantially immediately and the fibering reaction was completed in approximately 120 to 150 seconds, as could be readily observed visually since removal of the liquid resulted first in a cloudiness, then in a visible fracturing of the film, and the appearance of needle-like cracks in a generally parallel orientation. After the long slender fibers between 1 and 8 inches in length were formed on the glass plate, they were scraped off the surface with a silicone rubber blade and then placed in a sagger and fired at 600° C. for one hour, after which the sagger was removed from the furnace and placed in a second furnace at 1200° C. where the firing was continued for one hour longer, the sagger removed from the furnace, and the batch allowed to cool to room temperature.

Chemical analysis of the fiber indicated that it contained approximately 91% ZrO₂, 8.3% silicon dioxide, and the remainder consisted of traces of impurities such as alkalies, alkaline earths, iron oxide, and the like.

In comparing this fiber containing silica with a substantially pure zirconium oxide fiber made in the same way and from the same composition except for the absence of silica, it was found that the silica containing fibers exhibited tensile strength at room temperature in the range of 200,000 to 400,000 pounds per square inch, whereas the zirconia fibers made in the absence of silica exhibited tensile strengths in the range 50,000 to 100,000 pounds per square inch. After heat treatments for six hours, at temperatures of 1750° C., the fibers produced in the absence of silica became excessively brittle and crumpled readily on touching, whereas the fibers containing the silica had not only maintained their original flexibility but gave evidence of actually having improved in tensile strength.

Fibers made and tested after the 1200° C. firing could be bent 90° through about ten cycles in the case of the zirconium oxide type before such a fiber would fracture, whereas in the case of the zirconium oxide fibers complexed with silica, such fibers would stand at least 50 bends and in some cases up to 200 bends before fracturing was experienced.

Example 2

The same stock solutions as described in Example 1 were utilized except that an added stock solution of zirconium oxychloride was prepared by dissolving zirconium oxychloride crystals in water to produce a 55% solution by weight of the octahydrate of zirconium oxychloride in said water solution, equivalent to 21% zirconium oxide by weight.

As in Example 1, 900 cc. of the zirconium acetate solution were first placed in a beaker and added thereto was 77 cc. of the stock solution of zirconium oxychloride. After vigorous stirring, 20 drops of sodium lauryl sulfonate were added, followed by the addition of 60 cc. of a 35% silica sol in water. The method as recited in Example 1 was followed yielding a fiber containing approximately 91% zirconia and 8.5% silica. The fiber in raw form was produced on the glass plate about 60 to 70 seconds after placement under the infrared heaters.

Example 3

Two hundred twenty grams of commercial aluminum acetate were added to 850 cc. of water containing 60 cc. of concentrated hydrochloric acid. Twenty drops of sodium lauryl sulfonate were added and the batch stirred until a clear solution was obtained. Fifteen grams of 35% silica sol were then added and after vigorous stirring, the solution was subject to the fibering and firing process described in Example 1. The analysis of the finished product showed 89.7% aluminum oxide, 9.5% silicon dioxide, and the balance consisting of minor amounts or traces of impurities such as alkalies, iron oxide, lime, and the like. Fibers averaging between 2 and 6 inches in length with thicknesses between 0.5 and 0.2 micron and widths up to 5 microns were obtained.

Example 4

Ten cc. of concentrated hydrochloric acid were added to 500 cc. of water. Fifty-five grams of hydrated ferric chloride crystals were stirred in until dissolved, followed by the addition of 200 grams of hydrated ferrous acetate crystals. Twelve grams of 50% silica sol dispersion in water were finally added and after vigorous stirring the solution was subjected to the fibering and firing process described in Example 1. Fibers between 1 and 4 inches in length were obtained and in the original drying process, fibers began to appear in 40 to 60 seconds after placement under the infrared lights. The chemical analysis of the finished fibers after firing indicated that they contained approximately 93% iron oxide and approximately 7% silicon dioxide.

Example 5

Same as Example 4 except in place of the 200 gra[ms] of ferrous acetate utilized in Example 4, a mixture of 1[00] grams of ferrous acetate and 100 grams of nickel acet[ate] was used in the preparation. The finished fiber had an[al]ysis of approximately 45% nickel oxide, 48% iron oxi[de] and 7% silicon dioxide, and was unusual in that it e[x]hibited a black lustrous color.

Example 6

Sixty grams of hydrated chromic chloride were d[is]solved in 750 cc. of water, followed by the addition of 2[00] grams of hydrated chromous acetate. Twenty drops [of] sodium lauryl sulfonate were added, followed by t[he] addition of 18 grams of a 35% silica sol. Active fiberi[ng] action took place within about 60 seconds after inserti[on] of a 20 micron thick solution layer under the infrar[ed] lamps, and the finished fiber exhibited a deep green col[or]. Analysis indicated that the fiber contained approximate[ly] 91% chromium oxide and 8.5% silicon dioxide.

Having now described our invention in accordance wi[th] the patent statutes, we claim:

1. A non-vitreous fiber in the form of a ribbon of r[ec]tangular cross section composed of between about 5 and 15% by weight of silica and between about 85% a[nd] 95% by weight of an oxide of a metal selected from t[he] group consisting of aluminum, the rare earths, zirconiu[m,] hafnium, thorium, iron, cobalt, manganese, nickel a[nd] vanadium.

2. Fibers having a composition as defined in claim 1 a[nd] dimensions as follows: lengths from about 1 inch up [to] 8 inches, thicknesses between 0.1 and 1.0 micron, a[nd] widths from about 2 microns up to about 20 microns.

3. A fiber in the form of a ribbon of rectangular cro[ss] section composed of a metal salt of a carboxylic ac[id] whose dissociation constant is greater than $1.5 \times 10^{-5}$ and silica; wherein the relative proportion of metallic s[alt] to silica when the metal salt is expressed as the equivale[nt] metallic oxide content in the metal salt, lies between [85] to 95% metallic oxide and 5 to 15% silica, by weig[ht] wherein the metal salts are carboxylic acid salts of [a] metal selected from the group consisting of aluminu[m,] the rare earths, zirconium, hafnium, thorium, iron, cob[alt,] manganese, nickel, and vanadium.

4. Fibers having a composition as defined in claim [3] and dimensions as follows: length from about 1 inch to 8 inches, thicknesses between 0.15 and 1½ micro[ns] and widths from about 2 microns up to about 30 micro[ns].

5. A method of forming fibers in the form of ribbo[ns] of rectangular cross section having a thickness from abo[ut] 0.1 micron to about 1 micron and widths from abo[ut] 2 microns to about 20 microns and consisting of a maj[or] proportion of an oxide of a metal selected from the gro[up] consisting of aluminum, the rare earths, zirconiu[m,] hafnium, thorium, iron, cobalt, manganese, nickel a[nd] vanadium and a minor amount of silica which comprise[s] preparing a composition consisting essentially of a sol[u]tion containing (1) a metal salt of a carboxylic acid who[se] dissociation constant is greater than $1.5 \times 10^{-5}$, (2) a me[tal] salt of a strong mineral acid each of said salts being [a] salt of a metal selected from said group, and (3) a sili[ca] sol; wherein the relative proportion of said metal sa[lts] to silica when expressed as oxides, lies between 85% [to] 95% metallic oxide: 5%–15% silica, by weight; formi[ng] a layer of the composition in a thickness up to about [20] microns, on an infrared absorbing support of a mater[ial] to which the fibers do not adhere; exposing the layer [to] infrared to rapidly remove solvent therefrom, where[by] the layer dries and disintegrates into fibers; and recov[er]ing the loose fibers from the support.

6. The method of claim 5 wherein the pH of the fib[er] forming composition is adjusted to between 1 and 2 [by] addition of a material from the group consisting of stro[ng] mineral acids and metallic salts of strong mineral aci[ds].

7. The method of claim 5 wherein the mineral acid is hydrochloric acid.

8. The method of claim 5 wherein the carboxylic acid acetic acid.

9. The method of claim 5 wherein the fibers are subsequently fired at between 500° C. and 600° C. to remove all organic material and substituents and then fired temperatures up to about 1200° C.

References Cited in the file of this patent

UNITED STATES PATENTS

| | | |
|---|---|---|
| 1,577,189 | Patrick | Mar. 16, 1926 |
| 2,013,857 | Kinzie | Sept. 10, 1935 |
| 2,093,454 | Kistler | Sept. 21, 1937 |
| 2,491,761 | Parker | Dec. 20, 1949 |
| 2,627,506 | Hunter et al. | Feb. 3, 1953 |
| 2,651,598 | Ciapetta | Sept. 8, 1953 |
| 2,808,338 | Bruno | Oct. 1, 1957 |
| 2,886,404 | Teja | May 12, 1959 |
| 2,915,475 | Bugosh | Dec. 1, 1959 |
| 2,917,426 | Bugosh | Dec. 15, 1959 |
| 2,934,443 | Shell et al. | Apr. 26, 1960 |